(12) United States Patent
Evans (10) Patent No.: US 8,644,653 B2
(45) Date of Patent: Feb. 4, 2014

(54) COMPACT MULTIMODE INTERFERENCE ELEMENT

(75) Inventor: Peter W. Evans, Mountain House, CA (US)

(73) Assignee: Infinera Corporation, Sunnyvale, CA (US)

( * ) Notice: Subject to any disclaimer, the term of this patent is extended or adjusted under 35 U.S.C. 154(b) by 305 days.

(21) Appl. No.: 12/874,005

(22) Filed: Sep. 1, 2010

(65) Prior Publication Data

US 2012/0051687 A1    Mar. 1, 2012

(51) Int. Cl.
*G02B 6/26* (2006.01)
*G02B 6/28* (2006.01)
*G02B 6/125* (2006.01)

(52) U.S. Cl.
USPC .................................. 385/14; 385/24; 385/39

(58) Field of Classification Search
USPC ........................................ 385/14, 16, 39, 147
See application file for complete search history.

(56) References Cited

U.S. PATENT DOCUMENTS

| | | | | |
|---|---|---|---|---|
| 5,689,597 | A * | 11/1997 | Besse | 385/39 |
| 6,792,172 | B1 * | 9/2004 | Levy et al. | 385/15 |
| 8,131,120 | B2 * | 3/2012 | Doerr | 385/11 |
| 2003/0002797 | A1 * | 1/2003 | Chu et al. | 385/39 |
| 2003/0031406 | A1 * | 2/2003 | Saida et al. | 385/27 |
| 2007/0003183 | A1 * | 1/2007 | Shiba et al. | 385/14 |

* cited by examiner

*Primary Examiner* — Akm Enayet Ullah
(74) *Attorney, Agent, or Firm* — Ross M. Carothers; David L. Soltz

(57) ABSTRACT

The present disclosure provides a system, apparatus and method to for providing highly manufacturable compact optical structures in optical circuits, increasing overall yield and lowering manufacturing costs. According to one aspect, an optical circuit is provided which includes an multimode interference element and first and second waveguides. The first waveguide may be provided adjacent a first side of the optical device and extending along at least the length of the multimode interference element, while the second waveguide may be provided adjacent a second side of the multimode interference element and extending along at least the length of the optical device. Each of the first and second waveguide have first and second ends which may be configured to dissipate propagating light in the first and second waveguides. The first waveguide may be spaced a first distance from the multimode interference element, the first distance being substantially constant along the length of the multimode interference element, and the second waveguide may be spaced a second distance from the multimode interference element, the second distance being substantially constant along the length of the multimode interference element. The first and second distances may be selected such that the first and second waveguides provide sufficient fabrication loading to maintain a width of the optical device along, a length of the optical device, within a deviation or range of values. In certain embodiments, the multimode interference element may be a multimode interference optical coupler.

32 Claims, 8 Drawing Sheets

ABSTRACT COMPACT MULTIMODE INTERFERENCE ELEMENT

BACKGROUND

Optical transmission systems may include a multitude of optical structures, referred herein also as optical elements or optical devices. Often, these optical circuits may increase in complexity as the optical transmission systems are designed to meet higher capacity demands. The optical structures of the optical circuits may be used, for example, to guide one or more propagating optical signals. Some of the optical structures may act to combine or split propagating optical signals. For example, an exemplary optical structure may be configured to receive first and second optical signals and combine the first and second optical signals such that one or more outputs of the optical structure includes a first percentage, or first power, of the first optical signal and a second percentage, or second power, of the second optical signal.

Optical structures which combine or split optical signals to provide desired outputs including desired powers of the input optical signals may provide such outputs based upon the specific geometry of the optical structure, for example the length and/or the width of the optical structure. Such optical structures may be harder to fabricate in a consistent manner, in order to duplicate the optical structures in a multitude of similar optical circuits as part of a semiconductor wafer for example. Due to fabrication variations for example, it may be difficult to consistently fabricate certain optical circuits to meet desired design criteria unless appropriate consideration is made in circuit layout and chip layout. Varying distances or gaps between adjacent optical structures of an optical circuit, as defined within or as part of an associated mask pattern used during fabrication for example, load the etch process differently. This may lead to inconsistent optical structures as compared to associated design specifications, or as compared with other similar optical structures which share the design specifications. Such optical structures may include, for example, multimode interference couplers, or other optical combiners or optical splitters, or other optical structures which provide outputs which are a function of the geometry of the optical structure, such as a width or a length of the optical structure for example. To ensure consistent manufacturability of certain optical circuits, the optical structures of the optical circuits may be positioned relatively far apart from adjacent optical structures of the optical circuits. However, this results in larger optical circuits and, ultimately, higher manufacturing costs.

There is a need for highly manufacturable compact optical structures in optical circuits. There is also a need to provide compact optical structures which lead to compact optical circuits and lower manufacturing costs.

SUMMARY

The present disclosure provides a system, apparatus and method to for providing highly manufacturable compact optical structures in optical circuits, increasing overall yield and lowing manufacturing costs. According to one aspect, an optical circuit is provided which includes an multimode interference element and first and second waveguides. A multimode interference element, as used herein, includes a multimode interference coupler, combiner or splitter. The first waveguide may be provided adjacent a first side of the optical device and extending along at least the length of the multimode interference element, while the second waveguide may be provided adjacent a second side of the multimode interference element and extending along at least the length of the multimode interference element. Each of the first and second waveguides have first and second ends which may be configured to dissipate or scatter propagating light in the first and second waveguides. In some embodiments, the optical circuit is provided on a substrate, and the propagating light may be dissipated within a substrate. In certain embodiments, the multimode interference element may be an optical coupler, an optical combiner, or an optical splitter. In one embodiment, the multimode interference element is a multimode interference optical coupler. The first waveguide may be spaced a first distance from the multimode interference element, the first distance being substantially constant along the length of the multimode interference element. The second waveguide may be spaced a second distance from the multimode interference element, the second distance being substantially constant along the length of the multimode interference element.

In certain other embodiments, one or more of the first or second waveguides may include a first side which is nonparallel with a second side. In other embodiments, the first and second distances are selected such that the first and second waveguides provide sufficient loading during the fabrication process to maintain a width of the multimode interference element within a range of values. In some cases, this range of values may be represented by a deviation associated with the width of the multimode interference element. The deviation associated with the width of the multimode interference element may be relative to a deviation associated with a length of the multimode interference element. For example, the deviation associated with the width of the multimode interference element may be about 3% of the deviation associated with the length of the multimode interference element.

In still other embodiments, the first waveguide may include a tapered portion, such that a width of the first waveguide decreases from a point along the first waveguide to the first end of the first waveguide. The second waveguide may include a tapered portion, such that a width of the second waveguide decreases from a point along the first waveguide to the first end of the second waveguide. In certain embodiments, the first and second waveguides may include similar tapered portions on the second ends of the first and second waveguides, respectively. In other embodiments, the first and second ends of the first and second waveguides may include a curved portion, the curved portions directing any light which may be propagating in the first and second waveguides in a direction away from the multimode interference element. In yet additional embodiments, the first and second ends of the first and second waveguides are configured to dissipate light which may be propagating through the first and second waveguides, respectively. The light, for example, may be dissipated in the surrounding substrate or cladding material.

In another aspect, an optical circuit is provided which includes first, second, and third optical couplers, each having first and second inputs and first and second outputs, and first and second waveguides. Each of the optical couplers may be configured to accept first and second input lights on the first and second inputs and operate on the light to provide first and second output lights on the first and second outputs. The optical couplers may be arranged such that the first input of the second optical coupler is configured to receive light from the first output of the first optical coupler, and the first input of the third optical coupler configured to receive light from the second output of the first optical coupler. The first waveguide may be provided adjacent a first side of the first optical coupler and extending along at least the length of the first optical coupler, the second waveguide may be provided adjacent a second side of the first optical coupler and extending along at least the length of the first optical coupler. In certain embodiments, the first and second waveguides may have first and second end portions, each of the first end portions of each of the first and second waveguides may be configured to dissipate a portion of light propagating in the first and second waveguides, respectively.

It is to be understood that both the foregoing general description and the following detailed description are exemplary and explanatory only and are not restrictive of the invention, as claimed. Other objects, features and advantages of the invention will be apparent from the drawings, and from the detailed description that follows below.

BRIEF DESCRIPTION OF THE DRAWINGS

The accompanying drawings, which are incorporated in and constitute a part of this specification, illustrate one or more implementations described herein and, together with the description, explain these implementations. These drawings are intended to be illustrative, not limiting. In the drawings wherein like reference symbols refer to like parts.

DETAILED DESCRIPTION

The present disclosure provides a system, apparatus and method to for providing highly manufacturable compact optical structures in optical circuits, increasing overall yield and lowering manufacturing costs.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present disclosure may include certain aspects each of which may be present in hardware, software or firmware. Structures and devices shown below in block diagram are illustrative of exemplary embodiments consistent with this disclosure, and are not intended to be limiting. Furthermore, connections between components within the figures are not intended to be limited to direct connections. Rather, signals, whether optical or electrical, between these components may be modified, re-formatted or otherwise changed by intermediary components.

Reference will now be made in detail to the present exemplary embodiments, which are illustrated in the accompanying drawings.

Figure 1A:
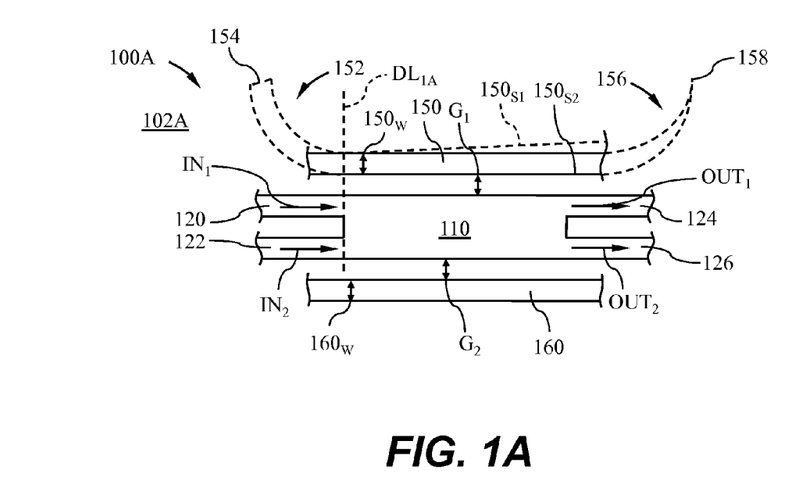
FIG. 1A is a planar diagram of an optical circuit, consistent with various aspects of the present disclosure.

Turning to FIG. 1A, an optical circuit 100A consistent with the present disclosure includes an optical combiner, or multimode interference (MMI) coupler 110, referred to herein also as an MMI coupler 110 or simply MMI 110. While the embodiments herein may be described in terms of an MMI coupler, one of ordinary skill in the art will appreciate that various aspects of the present disclosure may apply to other optical structures. The MMI 110 may include one or more inputs and one or more outputs. First and second waveguides 120, 122, for example, may provide first and second lights as inputs to MMI 110, as indicated by arrows $IN_1$, $IN_2$, respectively. The MMI 110 may couple or combine the first and second lights to provide third and fourth lights as outputs from MMI 110, as indicated by arrows $OUT_1$, $OUT_2$, respectively. The third light may be provided on a waveguide 124 and the fourth light may be provided on a waveguide 126. While the MMI 110 is described as receiving first and second lights on waveguides 120, 122 and providing third and fourth lights on waveguides 124, 126, it should be apparent to one of ordinary skill in the art that the first and second lights may alternatively be received on waveguides 124, 126 by the MMI 110, the MMI 110 providing the third and fourth lights on waveguides 120, 122 for example. Additionally, MMI 110 can be configured as a splitter by removing the second light, e.g. only providing the first light on the waveguide 120. In this example the first light would then be split, according to the specific design of the MMI 110, such that a first portion of the first light would exit the waveguide 124 and a second portion of the first light would exit the waveguide 126. While the waveguides 120, 122, 124, 126 are described as separate structures, the waveguides 120, 122, 124, 126 may be included as part of MMI 110.

Figure 1B:
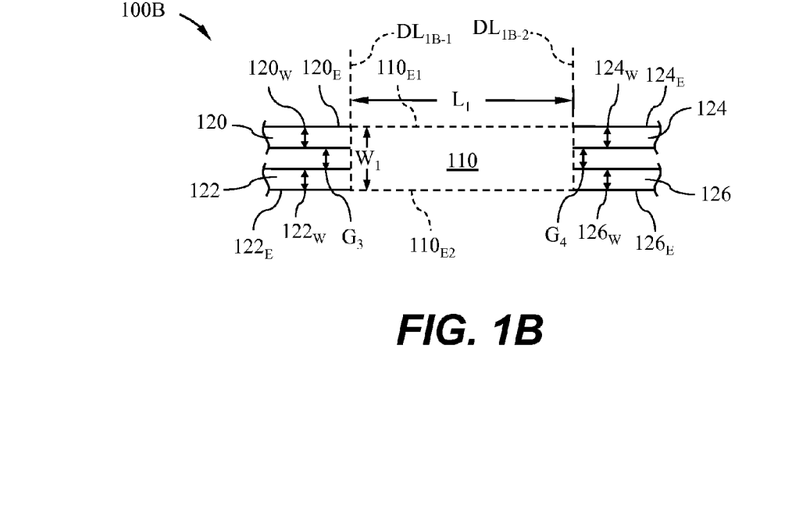
FIG. 1B is a planar view of certain detail of the optical circuit of FIG. 1A.

FIG. 1B shows various features of MMI 110 in greater detail. The functionality of the MMI coupler 110 is determined by its geometry. As shown in dashed line, the MMI 110 has a length $L_1$ and a width $W_1$, each selected to provide third and fourth lights at corresponding output waveguides 124, 126. The third and fourth lights may each include portions of the first and second lights, according to the design geometry of the MMI 110. As generally understood, as the waveguide 120 transitions into the MMI 110 the optical mode of the waveguide 120 adiabatically decomposes into eigenmodes associated with the MMI 110. The eigenmodes, including for example multiple guided higher order modes, associated with the MMI 110 then propagate along the length $L_1$ of the MMI 110. Depending on the length $L_1$ of the MMI 110, the MMI 110 may provide third and fourth lights, each including portions of the first and second lights, a power ratio for example. The length $L_1$ of the MMI 110 may be selected such that any power of the first and second lights may be present in each of the third and fourth lights. For example, the length $L_1$ of MMI 110 may be selected such that 50% of the power associated with each of the first and second lights is present in each of the third and fourth lights, respectively. Alternatively, the length $L_1$ of the MMI 110 can be selected such that 100% of the power of the first light is provided as the third light, and 100% of the power of the second light is provided as the fourth light.

As is generally understood, most MMI couplers may be based on self-imaging, such that the input field profile of an optical signal is reproduced at various points along the length of the MMI in the propagation direction. The locations along the length where the field profile is reproduced may be represented by the equation:

$$L = \frac{M}{N} * 3L_C, \text{ with } L_C = \frac{4nW^2}{3\lambda} \quad (1)$$

where:

N is the number of inputs of the MMI;

M is an integer number without a common divisor with N, that defines the other MMI lengths where the reproduced field profile appears, n is the effective refractive index of the MMI;

λ is the wavelength in vacuum; and

W is the width of the MMI.

From equation (1) above, the length along the MMI, such as the length $L_1$ along the MMI 110, at which the field profile of an optical signal is reproduced is dependent on the square of the width W of the MMI. Thus, in order to consistently fabricate MMI couplers to provide desired outputs based upon one or more inputs, the width W of the MMI coupler should be maintained within a range of values along the length of the MMI coupler. Sometimes this may be difficult due to fabrication tolerances. Accordingly, since the desired operation of the MMI 110 is a function of the width $W_1$ of the MMI 110, care must be taken during fabrication in order to ensure that the width $W_1$ remains substantially constant along the length $L_1$ of the MMI 110. Here, substantially constant means within a range of width values within which the MMI 110 would provide a desired output for a given length $L_1$. For example, an MMI 110 tolerant to deviations in length $L_1$ of about 2 μm is tolerant to deviations in width $W_1$ of about 0.06 μm, in other words the deviation in width $W_1$ is about 3% of the deviation in length $L_1$.

As shown in FIG. 1B, waveguide 120 may have a width $120_W$ and my be positioned such that an edge $120_E$ of the waveguide 120 is contiguous with an edge $110_{E1}$ of the MMI 110. As with waveguide 120, waveguide 122 may have a width $122_W$ and may be positioned such that an edge $122_E$ of the waveguide 122 is contiguous with an edge $110_{E2}$ of the MMI 110. Similarly, waveguide 124 includes a width $124_W$ and an edge $124_E$ which is consistent or continuous with the edge $110_{E1}$ of the MMI 110, and waveguide 126 may include a width $126_W$ and an edge $126_E$ which is consistent or continuous with the edge $110_{E2}$ of the MMI 110. At least at a point where the waveguides 120, 122 interface with the MMI 110, as indicated along dashed line $DL_{1B-1}$, the waveguide 120 is spaced from the waveguide 122 a distance or gap $G_3$. Similarly, at least at a point where the waveguides 124, 126 interface with the MMI 110, as indicated along dashed line $DL_{1B-2}$, the waveguide 124 is spaced from the waveguide 126 a distance or gap $G_4$. The distance or gap $G_3$ may be the same or different than the distance or gap $G_4$. In one design, the desired width $W_1$ of the MMI 110 may be approximately equal to the width $120_W$ of waveguide 120, plus the width $122_W$ of the waveguide 122, plus the gap distance $G_3$. Further, the width $120_W$ of waveguide 120 may be equal to the width $122_W$ of the waveguide 122.

Returning to FIG. 1A, the optical circuit 100A may also include a waveguide 150 and a waveguide 160. Waveguide 150 has a width $150_W$ and is spaced from the MMI 110 a distance or gap $G_1$. Similarly, waveguide 160 has a width $160_W$ and is spaced from the MMI 110 along a second side of MMI 110 a distance or gap $G_2$. As shown, the gaps $G_1$, $G_2$ are constant at least along a length of the MMI 110, e.g. the entire length $L_1$ of the MMI 110. While the gaps $G_1$, $G_2$ are preferably constant at least along the length $L_1$ of the MMI 110, the waveguides 150, 160 need not include sides which are substantially parallel with each other. For example, for illustrative purposes only, the waveguide 150 may include a side $150_{S1}$ (shown in dashed line) which is nonparallel to another opposing side $150_{S2}$. Although only depicted with respect to the waveguide 150, each of the waveguides 150, 160 may include a first end portion 152 terminating in an end 154 (shown in dashed line). The end portion 152 may include a curved portion which is configured to curve away from the MMI 110 such that the end 154 is at a distance from the edge $120_E$ of waveguide 120 greater than the distance or gap $G_1$. The curved portion may be configured to direct light which may be propagating in the waveguide 150 away from the MMI 110 structure mitigating the possibility that such propagating light in the waveguide 150 would enter the MMI 110. Alternatively, waveguide 150, or waveguide 160 for that matter, may include a tapered end portion 156 which tapers to an end 158, the width of the waveguide decreasing from a point along the waveguide 150 to the end 158. A portion of propagating light in the waveguide 150 may be dissipated into a substrate 102A upon which the optical circuit 102A is provided. Curved end portions 154, 158 also mitigate interference with the light traveling in the input waveguide 120 and the output waveguide 124. Alternatively, waveguide may abruptly terminate near an end of the MMI 110 structure, at the dashed line $DL_{1A}$ for example.

While preferably waveguides 150, 160 do not propagate light in order to mitigate optical interference with the remaining portion of optical circuit 100A, if desired, waveguides 150, 160 may be configured to guide light, as part of another circuit adjacent optical circuit 100A for example. Waveguides 150, 160 which are not necessarily designed to propagate light may be also referred to as dummy structures or dummy waveguides 150, 160. One of ordinary skill in the art will note that while the dummy waveguides 150, 160 may not be designed to propagate light as part of an optical circuit, light from other optical circuits may still be able to enter and propagate through the dummy waveguides 150, 160. Thus, the dummy waveguides 150, 160 may includes structures which mitigate or dissipate light propagating through the dummy waveguides 150, 160. The gap $G_1$ may be the same or different than the gap $G_2$. With reference also to FIG. 1B, each of the gaps $G_3$, $G_4$ may be the same or different from each of the gaps $G_1$, $G_2$. Preferably, the gaps $G_1$, $G_2$, $G_3$, $G_4$ are substantially the same to ensure that the loading effects associated with the fabrication process are kept as uniform as possible. In this way, an optical circuit similar to the optical circuit of 100A, sharing the same design specifications for example, will have similar performance characteristics as the optical circuit of 100A regardless of whether the similar optical circuit is fabricated elsewhere as part of the same optical circuit chip, or fabricated at another location on a wafer upon which the circuit 100A of FIG. 1A is located, or on a different wafer.

Figure 2A:
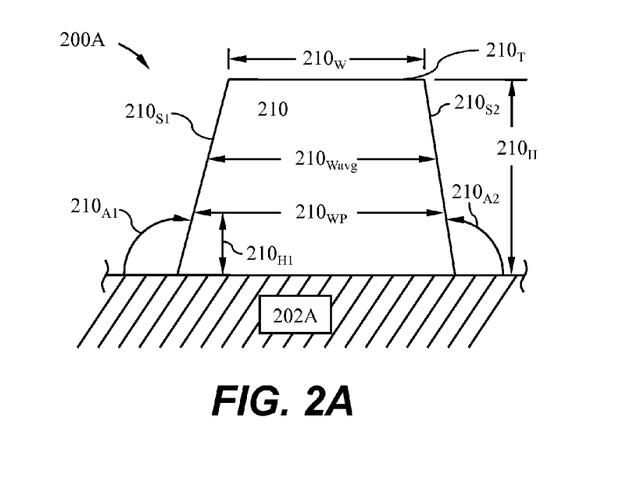
FIG. 2A is a cross section view of an optical circuit, consistent with various aspects of the present disclosure.

The waveguides 150, 160 are spaced from each other a gap or distance $G_1$, $G_2$, respectively, along the length $L_1$ of the MMI 110 to provide a loading effect during the fabrication process. In the context of the present disclosure, uniform gaps between optical structures, including dummy structure or waveguides, ensure that adjacent optical structures have consistent proximity to patterned and non-patterned material and therefore share uniform etching characteristics, such as etch depth and contour, which define the geometric width of the optical structures. Such loading, for example, allows for the consistent fabrication of the MMI 110 relative to the desired design specification, and to other MMI structures sharing a similar design specification, or other optical structures which utilize such MMI structures, as discussed in more detail below. Turning to FIG. 2A, a pattern and associated loading of the fabrication process provided by the waveguides 150, 160, and/or dummy structures 150, 160, and utilized during the fabrication process will be described in greater detail. As shown, a cross section of an optical element 210 is depicted on a substrate 202A. The optical element 210 may be, for example, a waveguide, an MMI coupler, similar to MMI 110, an optical combiner, or an optical splitter. The optical element 210 may be fabricated through any suitable means, for example through chemical deposition and etching processes, as well known in the art. Such processes may include dry-etch reactive ion etching (RIE) and/or inductively coupled plasma (ICP) processes, as well as wet-etch and other processes. In an exemplary process, a semiconductor material may be deposited on the substrate 202A. Then, a mask may be used to define a layer of photoresist upon a top surface $201_T$ of the semiconductor material, the photoresist defining that part of the semiconductor material which is to be removed. During etching, the semiconductor material is removed and the resulting structure may be in the form of the optical element 210. While shown as a single layer of semiconductor material, optical element 210 may be formed through processes which result in the creation of multiple layers, and optical element 210 may include material other than semiconductor material.

As shown, optical element 210 has a height $210_H$ and a width $210_W$. While the width $210_W$ of the optical element 210 is depicted with respect to the top surface $210_T$ of the optical element 210, the width $210_W$ may be represented in other manners. For example, the width $210_W$ may be an average width $210_{WAVG}$ along the height $210_H$ of the optical element 210, or the width $210_W$ may be defined as that width $210_{WP}$ at a specific height $210_{H1}$ value along the height $210_H$ of the optical element 210. The etching process may result in side portions $210_{S1}$, $210_{S2}$ forming corresponding angles $210_{A1}$, $210_{A2}$ with the substrate 202A. Depending upon the other optical structures fabricated adjacent to the optical element 210, the width $210_W$ of the optical element 210 may fluctuate along a length of the optical element 210. If the optical element 210 is an MMI coupler, for example similar to the MMI 110, fluctuations in the width $210_W$ of the optical element 210 may lead to undesirable outputs, or outputs otherwise unpredictable or inconsistent with a desired design of the optical element 210.

Figure 2B:
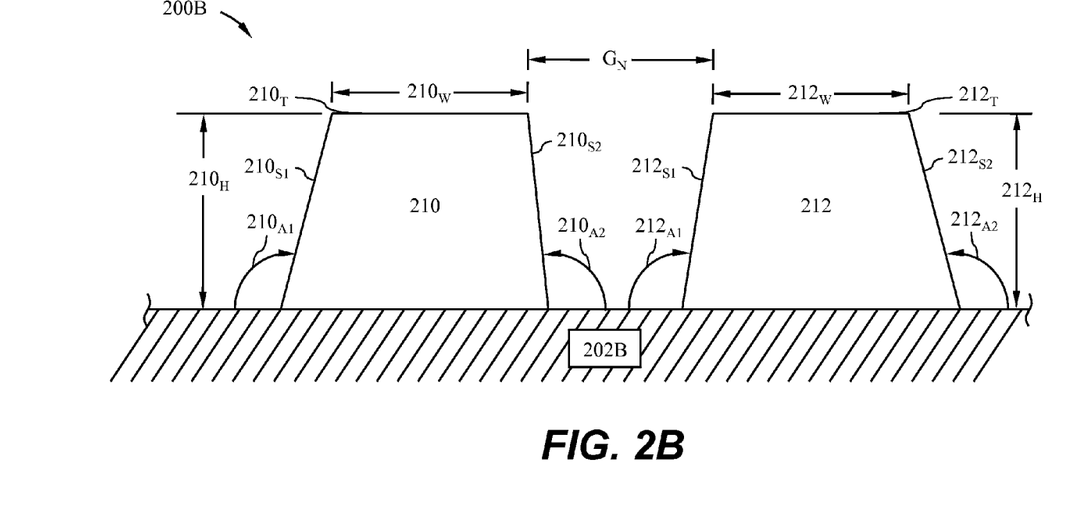
FIG. 2B is a cross section view of another optical circuit, consistent with various aspects of the present disclosure.

Turning to FIG. 2B, optical element 210 is provided on a substrate 202B, adjacent to another optical element 212. Optical element 212 may be similar to optical element 210. The optical element 212 may include a height $212_H$, a width $212_W$, a top surface $212_T$, and side surfaces $212_{S1}$, $212_{S2}$. While the height $212_H$ and width $212_W$ of the optical element 212 are shown as being similar to the height $210_H$ and width $210_W$ of the optical element 210, one or more of the height $212_H$ and width $212_W$ of the optical element 212 may be the same or different than the height $210_H$ and width $210_W$ of the optical element 210. Similar to optical element 210, the sides $212_{S1}$, $212_{S2}$ of the optical element 212 form corresponding angles $212_{A1}$, $212_{A2}$ with the substrate 202B.

As depicted, the optical element 212 may be positioned a distance or gap $G_N$ with respect to the optical element 210. Gap $G_N$, for example, may be representative of the gaps $G_1$, $G_2$, $G_3$, $G_4$ mentioned above, or other gaps between optical elements or structures as discussed or contemplated herein. While the gap $G_N$ is shown with respect to the top surfaces $210_T$, $212_T$ of the optical elements 210, 212, the gap $G_N$ could be representative of any distance between the optical elements 210, 212 along a height off the substrate 202B. Since the optical element 212 is fabricated a short distance from the optical element 210, the spaced optical elements 210, 212 provide sufficient loading during the etching process so that the adjacent sides $210_{S2}$, $212_{S1}$ of each corresponding optical element 210, 212 form angles $210_{A2}$, $212_{A1}$ which may be less than the angles $210_{A1}$, $212_{A2}$ of corresponding sides $210_{S1}$, $212_{S2}$. Mutual loading between the optical element 210 and the optical element 212 during etching of the fabrication process may result in the side $210_{S2}$ of optical element 210 and side $212_{S1}$ of optical element 212 being more uniform and consistent along at least the length where side $210_{S2}$ is adjacent to side $212_{S1}$. If, in this example, the optical elements 210, 212 were the only optical elements in the optical circuit 200B, then there would be no fabrication loading associated with side $210_{S1}$ of optical element 210 and side $212_{S2}$ of optical element 212. Therefore, the sides $210_{S1}$, $212_{S2}$ may be inconsistent and non-uniform along the length of the corresponding optical element 210, 212. Accordingly, the widths $210_W$, $212_W$ of the optical elements 210, 212 may vary along the corresponding lengths of the optical elements 210, 212, respectively. Thus, if either of the optical elements 210, 212 were optical elements having outputs related to the corresponding geometry of the optical elements, such optical elements may be harder to reliably manufacture. Conversely, returning to FIG. 1A, since the waveguides 150, 160 are spaced from the MMI 110 a distance or gap $G_1$, $G_2$ sufficient to provide appropriate loading as between the waveguides 150, 160 and the MMI 110, the sides of the MMI 110 along the length of the MMI 110 may be manufactured more consistently. Thus, the width $W_1$ of the MMI 110 may be maintained within a range of values along the length $L_1$ of the MMI 110, such that the MMI 110 provides a desired output in accordance with its design specification. As should be apparent to one of ordinary skill in the art, the waveguides 150, 160 may be other optical elements or structures. For example, another MMI coupler may be positioned adjacent to the MMI 110, the side of the MMI 110 adjacent the additional MMI coupler more consistently formed along the length $L_1$ of the MMI 110 due to the fabrication loading provided by the additional MMI coupler.

Figure 3:
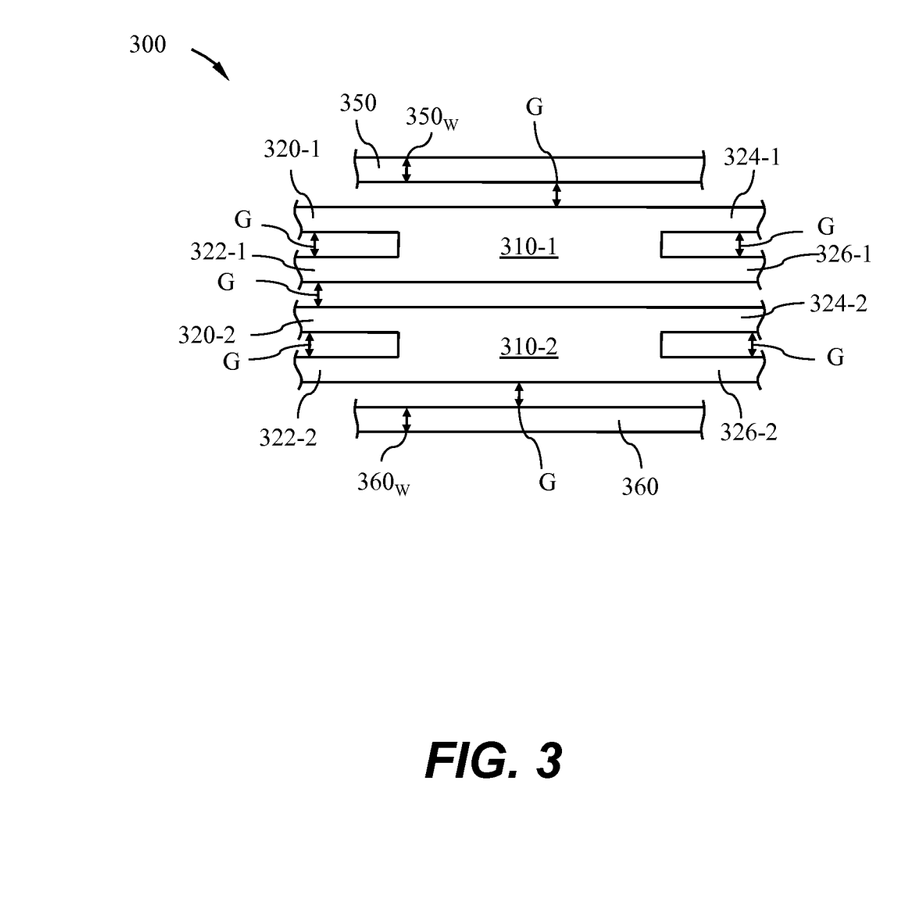
FIG. 3 is a planar view of another optical circuit, consistent with various aspects of the present disclosure.

Turning to FIG. 3, an optical circuit 300 is depicted to include a first MMI 310-1 and a second MMI 310-2. While only two MMI structures 310-1, 310-2 are depicted in FIG. 3, the following discussion also pertains to an integer number, n, of adjacent MMI structures, or other optical elements or structures described or contemplated herein. Hereinafter, the gaps between the various optical elements are referred to as gaps G. While referred to as gaps G, this does not necessarily mean that each of the gaps are identical. Rather, the gaps G are each selected to provide adequate loading during the fabrication process, as discussed herein, which encourages consistent or more uniform geometry associated with the corresponding optical elements. This consistent geometry, in turn, provides for manufacturability of optical elements which are closer to design specifications from optical element to optical element, resulting in compact optical circuits.

MMI 310-1 and MMI 310-2 may be similar to MMI 110, for example each configured to receive input lights by waveguides 320-1, 322-1, 320-2, 322-2, and providing output lights on waveguides 324-1, 326-1, 324-2, 326-2. A gap G is provided between waveguide 320-1 and waveguide 322-1 of MMI 310-1, and another gap G is provided between waveguide 324-1 and waveguide 326-1 of MMI 310-1. Similarly, a gap G is provided between waveguide 320-2 and waveguide 322-2 of MMI 310-2, and another gap G is provided between waveguide 324-2 and waveguide 326-2 of MMI 310-2. The discussion above regarding gaps G3 and G4 of MMI 110 pertains also to gaps G of MMI 310-1 and gaps G of MMI 310-2, as well. MMI 310-1 is spaced a distance or gap G from MMI 310-2. Similar to waveguides 150, 160 as part of the optical circuit 100A, optical circuit 300 includes waveguide 350 and waveguide 360. Waveguide 350 has a width 350W and is separated by the MMI 310-1 by gap G, while waveguide 360 has a width 360W and is separated or spaced from the MMI 310-2 by gap G.

Thus, each of the optical elements or structures of optical circuit 300 is spaced from other elements by a gap or distance G such that adjacent optical elements or structures provide adequate loading during the fabrication process, which in turn leads to more consistent or uniform widths along the lengths of the MMI structures 310-1, 310-2. While the lengths of the MMI structures 310-1, 310-2 are shown to be similar, as should be apparent to one of ordinary skill in the art, the length of MMI 310-1 may be different from the length of MMI 310-2, a different output of light being desired relative to the input light for MMI 310-1 for example. As long as the optical structures adjacent to the MMI structures 310-1, 310-2 are maintained at a desired gap along the lengths of the MMI structures 310-1, 310-2, the corresponding widths of the MMI structures 310-1, 310-2 along the length of the MMI structures may be maintained between a range of values, thus preserving the desired outputs of the MMI 310-1 and MMI 310-2.

Figure 4:
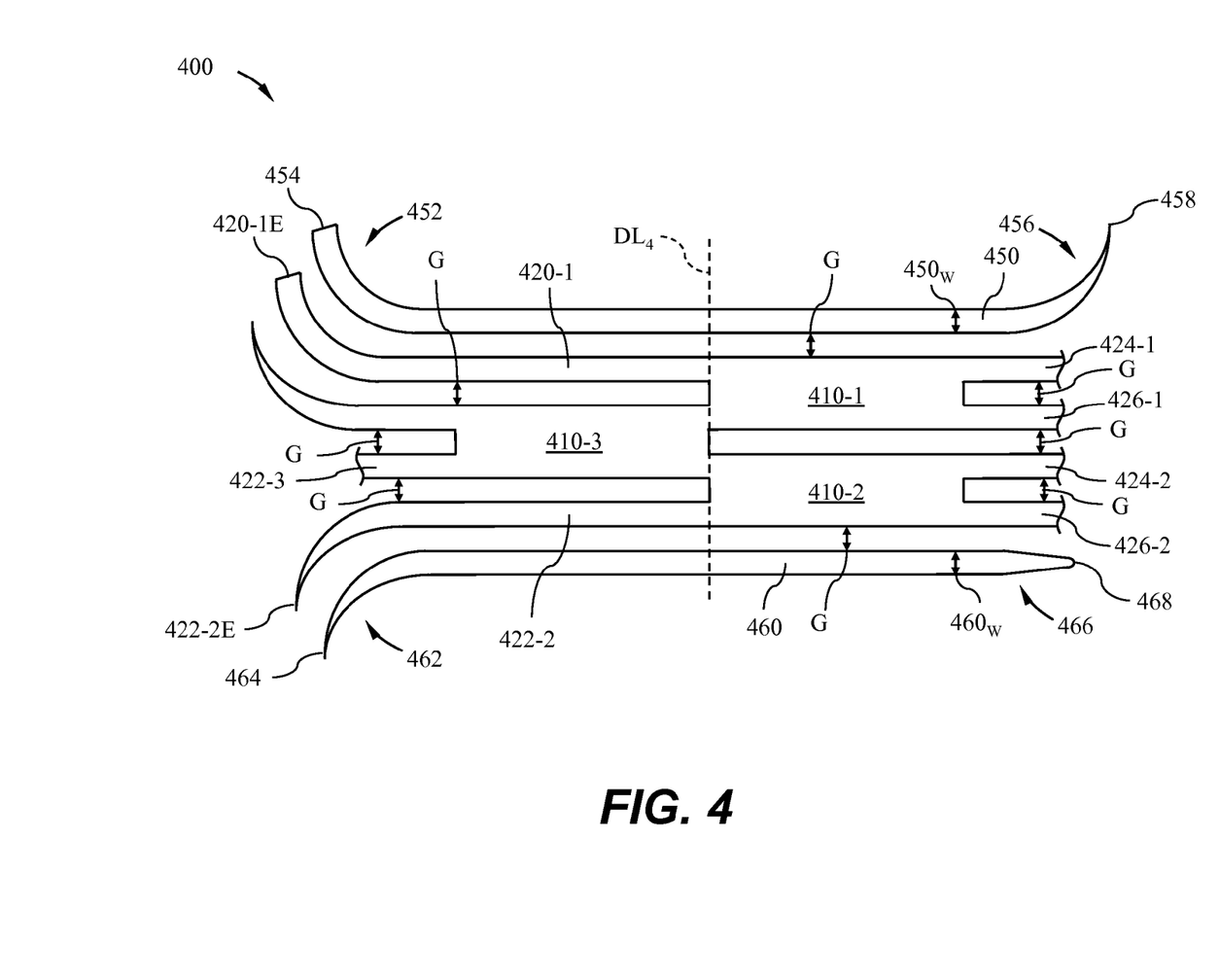
FIG. 4 is a planar view of yet another optical circuit, consistent with various aspects of the present invention.

Turning to FIG. 4, an optical circuit 400 includes MMI 410-1, MMI 410-2, and MMI 410-3, each of which being similar to MMI 110 for example. Optical circuit 400 may also include first and second waveguides 450, 460, which may be similar to waveguides 150, 160. Each of the waveguides 450, 460 and MMI structures 410 separated from adjacent optical elements by a gap G. MMI 410-1 and MMI 410-2 may be optically coupled to MMI 410-3, through a butt joint for example, as depicted along dashed line $DL_4$. Typically, such arrangements would require separate waveguides between the MMI structures 410 to ensure proper fabrication of the MMI structures 410. However, utilizing component layout principles of the present disclosure, more consistent optical elements, such as elements 410, can be manufactured allowing for closer placement of such optical elements in an optical circuit, and ultimately more compact optical structures.

As discussed above with respect to waveguide 150, waveguide 450 may be configured to propagate light as part of the optical circuit 400. Alternatively, as shown, the waveguide 450 may be configured to not propagate light as part of circuit 400. Consistent with the latter, the waveguide 450 may include a first end portion 452 which ends in a first end 454. The end portion may be curved, for example curved in a direction away from the remainder of the circuit 400, in order to mitigate light which may be propagating through the waveguide 450 from entering the remainder of the optical circuit 400. While the end 454 is shown as relatively blunt, the end 454 may be formed in a taper. For example, waveguide 450 may include a second curved end portion 456 which may taper into an end 458 which at least has a width which is less than the width 450W of the waveguide 450. Alternatively, the width $450_W$ of the waveguide 450 may taper to a point at end 458. Such a tapered portion, as part of end portion 456, will help to dissipate light which may be propagating in waveguide 450 into the surrounding substrate, such as a substrate 402 (not shown) upon which the waveguide 450 is provided. Waveguide 460 includes another exemplary end portion 466. End portion 466 is not curved, but tapers into an end 468. As one of ordinary skill in the art will appreciate, the geometry of the point end 458 or end 468 is dependent upon the technology utilized to fabricate the corresponding end portion 456, 466. For example, resolution of the end 458 will be limited to the step increments associated with steppers used to fabricate the end 458, as is well known in the art. As with curved end portion 452, end portion 456 is preferably curved in a direction in order to guide light which may be propagating through the waveguide 450 away from the remainder of the optical circuit 400.

Optical circuit 400 may be configured to accept a first light and split the first light into a plurality of output lights. For example, the first light would be received by MMI 410-3 along a waveguide 422-3. The MMI 410-3 may split the first light to provide duplicates of the first light to MMI 410-1 and MMI 410-2. Here, duplicates means the first light may be split by the MMI 410-3 into two output lights, a first of the two output lights provided to MMI 410-1 and a second of the two output lights provided to MMI 410-2 at the dashed line DL. The first light may be split with any desired ratio, a power of the first light provided to MMI 410-1 being the same or different than a power of the first light provided to the MMI 410-2. In this example, since the input light is only provided by the waveguide 422-3 to MMI 41-3, waveguide 420-3 may have an end portion similar to either end portion 452, 456 of waveguide 450, or end portion 466 of waveguide 460. Each of the MMI structures 410-1, 410-2 split the light received from the MMI 410-3 to form two output lights, in similar fashion to MMI 410-3. The light received by MMI 410-1 from MMI 410-3 is split into a first output light provided on a waveguide 424-1 and a second output light provided on a waveguide 426-1. Similarly, the light received by MMI 410-2 from MMI 410-3 is split into a first output light provided on a waveguide 424-2 and a second output light provided on a waveguide 426-2. As stated above regarding the MMI 410-3, each of the MMI structures 410-1, 410-2 may be configured to duplicate the light received from the MMI 410-3, each of the outputs on the waveguides 424-1, 424-2, 426,1 426-2 including a portion of the light received from MMI 410-3, but perhaps at a different power ratio, as desired. Since MMI 410-1 is acting as a splitter in this example, the input waveguide 420-1 may include a curved end portion ending in an end 420-1E, similar to end 454 of waveguide 450. As mentioned, the curved end portion and end 420-1E act to mitigate undesirable light from entering the optical circuit 400, as well as dissipating light received from the MMI 410-1, due to reflection for example, into the surrounding substrate. Similarly, the input waveguide 422-2 may have a curved end portion ending in an end 422-2E. In order to provide adequate fabrication loading with regard to the fabrication of MMI 410-3, it is desirable for the waveguide structures 420-1, 422-2 to be provided a distance from the MMI 410-3, a distance or gap of G for example, along the length L1 of MMI 410-3. In similar fashion, in order to provide adequate fabrication loading with regard to the fabrication of MMI 410-1 and MMI 410-2, waveguides 450, 460 extend a distance or gap G from the MMI 410-1 and MMI 410-2, respectively.

Figure 5:
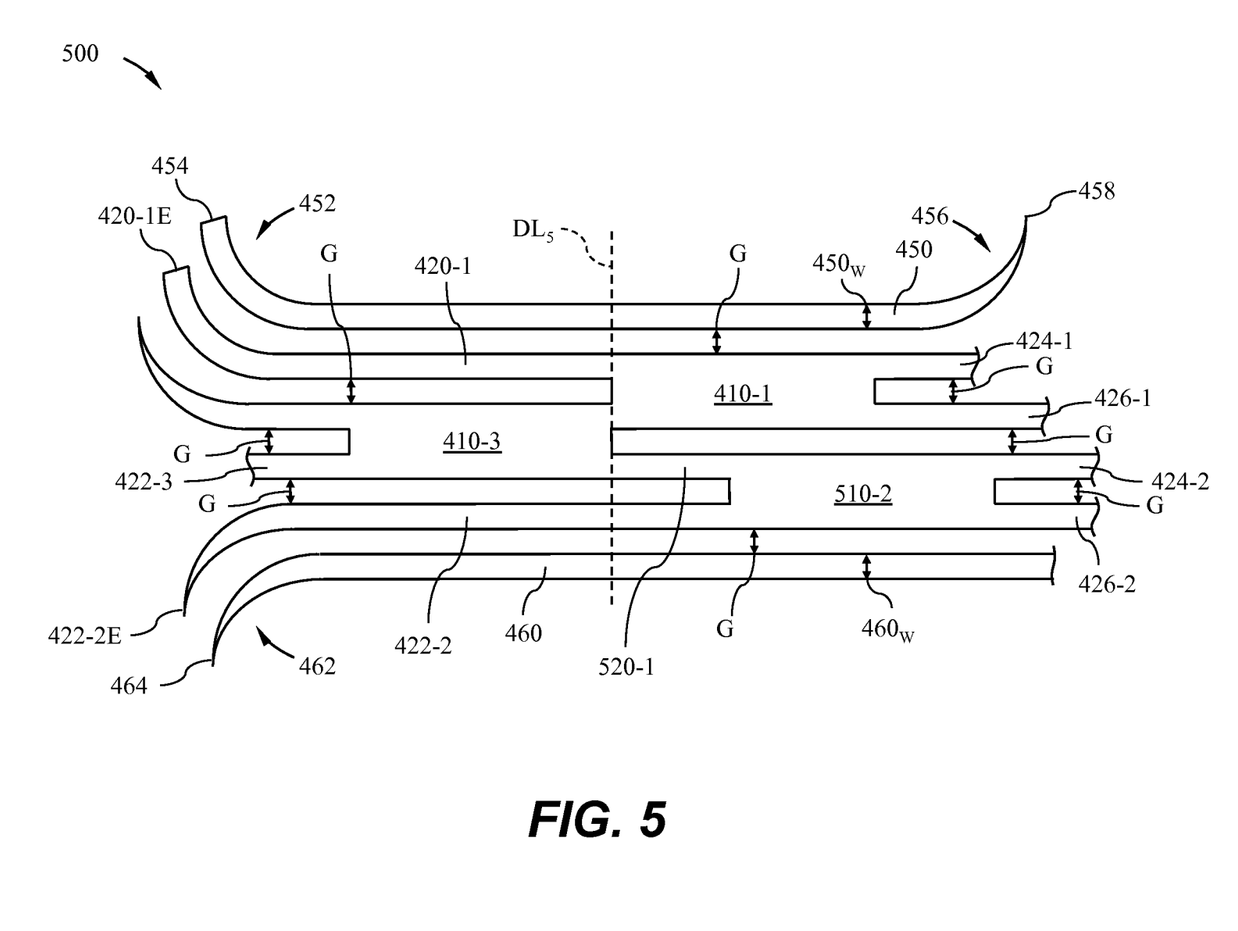
FIG. 5 is a planar view of still another optical circuit, consistent with various aspects of the present disclosure.

Turning to FIG. 5, an optical circuit 500 is similar to optical circuit 400, however MMI 410-2 is replaced with an MMI 510-2. MMI 510-2 may be similar to MMI 110. MMI 510-2 is positioned spaced from the MMI 410-3 such that a waveguide 520-1 is provided to guide second output light from MMI 410-3 to the MMI 510-2. The waveguide 520-1 is spaced from MMI 410-1 a distance or gap G and, depending on the design of the MMI 520-1, may also be spaced a distance or gap G with respect to the waveguide 422-2. As shown, it is preferable to extend the waveguide 426-1 such that it extends past the MMI 510-2 to provide sufficient fabrication loading with respect to MMI 510-2. Additionally, waveguide 460 may extend past MMI 510-2 to provide sufficient fabrication loading with respect to MMI 510-2.

Figure 6:
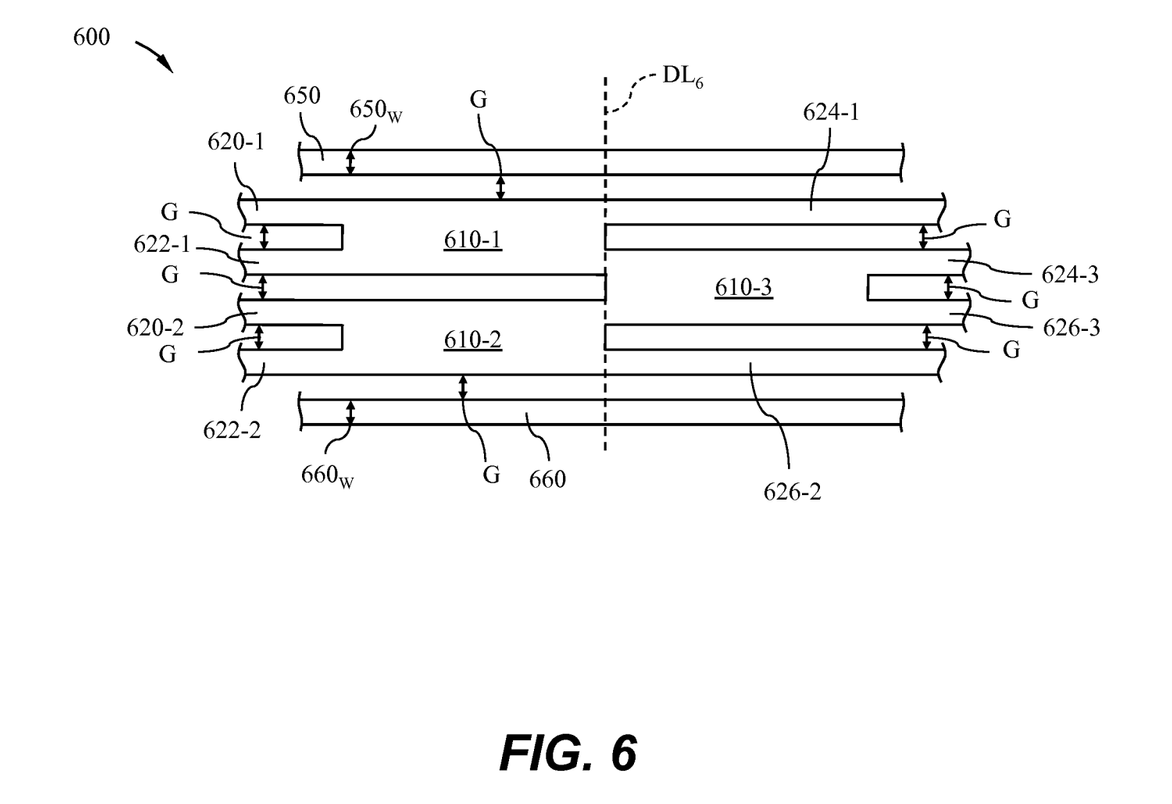
FIG. 6 is a planar view of another optical circuit, consistent with various aspects of the present disclosure.

While the optical circuits 400, 500 have been described with respect to light propagating through the optical circuits 400, 500 from the left to the right, this is for demonstration purposes only. As one of ordinary skilled in the art will appreciate, such circuits are bidirectional and the light may propagate in a direction from right to left with respect to the optical circuits 400, 500 of FIGS. 4 and 5, respectively. In such case, the circuits act as optical combiners rather than optical splitters. Turning to FIG. 6, optical circuit 600 includes MMI structures 610-1, 610-2, 610-3 and waveguides 650, 660. Each of the MMI structures 610-1, 610-2, 610-3 and waveguides 650, 660 are spaced from adjacent optical elements a distance or gap G. In operation, MMI 610-1 accepts two input lights, a first input light on waveguide 620-1 and a second input light on waveguide 622-1. MMI 610-1 combines the input lights received on waveguides 620-1, 622-1 to provide output lights, a first output light provided on waveguide 624-1 and the second output light provided directly to the MMI 610-3, through a butt joint along the dashed line $DL_6$ for example. Similarly, MMI 610-2 combines the input lights received on waveguides 620-2, 622-2 to provide output lights, a first output light provided directly to the MMI 610-3, through a butt joint along the dashed line DL for example, and a second output light provided on waveguide 626-2. MMI 610-3 combines the output light from 610-1 and the output light received from MMI 610-2 and provides output lights at waveguide 624-3 and waveguide 626-3. As discussed herein, the output lights from the MMI structures 610-1, 610-2, 610-3 may include various ratios of the corresponding input lights received by the MMI structures 610-1, 610-2, 610-3. Thus, the output light on each of the waveguides 624-3, 626-3 of MMI 610-3 may include a portion of the output light received from MMI 610-1 and a portion of the output light received from MMI 610-2. Such combinations of MMI structures 610-1, 610-2, 610-3 may be referred to as compact MMI structure 610 or cMMI 610.

Figure 7:
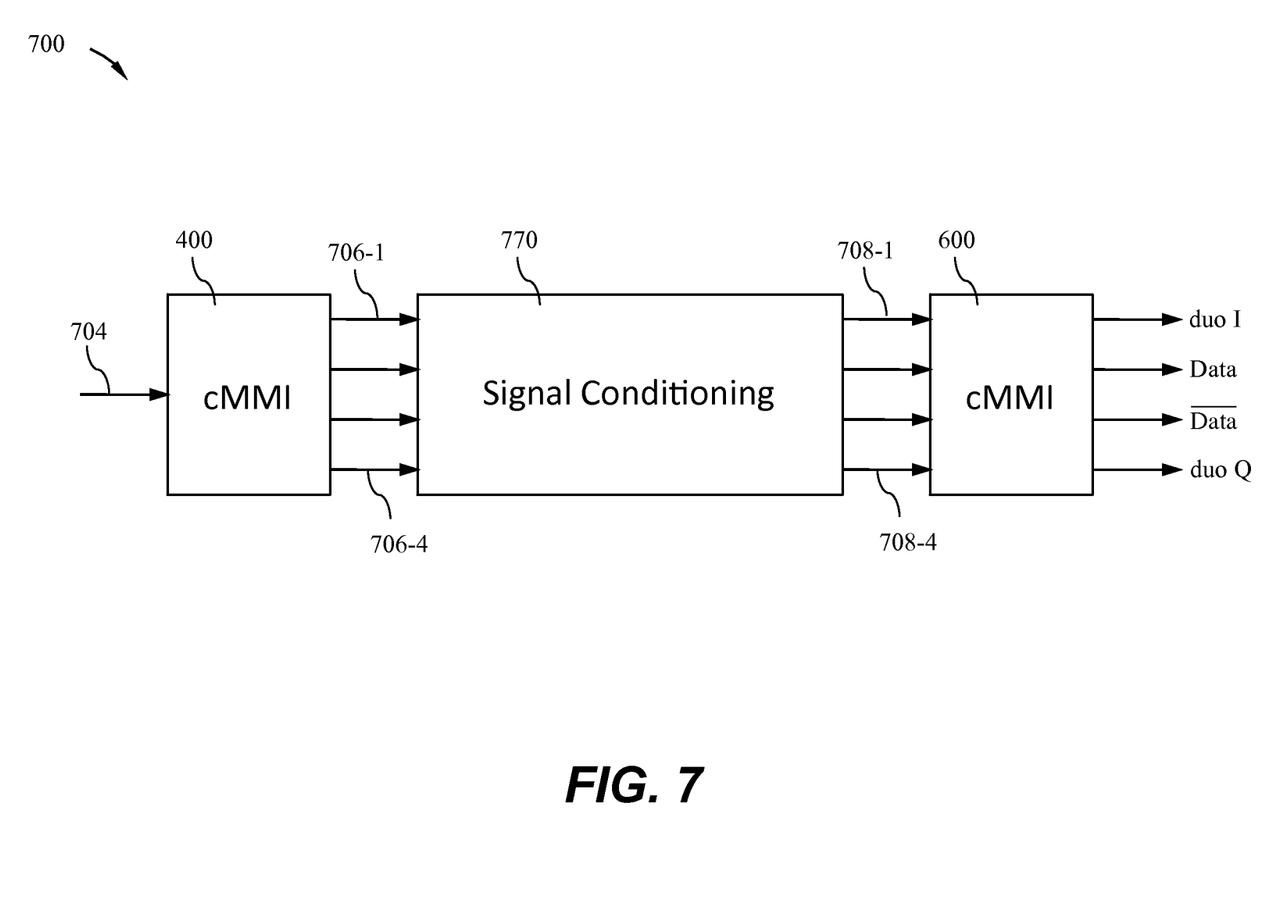
FIG. 7 is a block diagram of a yet another optical circuit, consistent with various aspects of the present disclosure.

Turning to FIG. 7, a general overview of an exemplary circuit 700 depicts one use of the embodiments of the present disclosure. Circuit 700 includes first and second compact MMI structures 400, 600 referred to also as cMMI 400 and cMMI 600, and a signal conditioner 770. Here the term "signal conditioner" of the signal conditioner 770 is not meant to be limiting, but rather, is used to broadly define one or more operations on one or more optical signals which propagate through the circuit 700. Such operations may be passive or active. Example passive signal conditioners may include optical couplers, combiners, splitters, or waveguides. Example active signal conditioners may include optical amplifiers, optical attenuators, power flatteners or equalizers between two or more optical signals propagating through the optical circuit 700. In exemplary circuit 700, an optical signal is provided along waveguide 704 to cMMI 400. cMMI 400 is similar to optical circuit 400 of FIG. 4. As with the optical circuit 400, cMMI 400 splits an the optical signal received along waveguide 704 into 4 separate lights provided on waveguides 760-1 through 760-4. The second optical input to the optical circuit 400, as shown in FIG. 4 is configured to mitigate undesirable propagation of light, having a curved end portion for example. If desired, the cMMI 400 may be configured to receive a second input, the cMMI 400 combining the first and second input lights. In such a case the first and second input lights may be the same or different with respect to wavelengths and intensity. While the cMMI 400 is shown spaced from the signal conditioner 770, cMMI 400 may be incorporated into the signal conditioner 770, such that the waveguides 760 are no longer necessary. The signal conditioner 770 may then operate on one or more optical signals propagating through optical circuit 700, and provide one or more optical outputs along a corresponding waveguide 708. For example, as shown, the signal conditioner may provide four output lights on waveguides 708-1 through 708-4.

cMMI 600 may be similar to optical circuit 600 of FIG. 6. The cMMI 600 may be configured to accept the input lights received on the waveguides 708 from signal conditioner 770 and combine the signals into two output lights. A first output light corresponding to the output Data signal, and a second output light corresponding to the output $\overline{\text{Data}}$ signal. The Data signal and the $\overline{\text{Data}}$ signal may be outputs of a DQSPK transmitter, for example, as better understood with respect to the discussion below. The output signals shown below "duo I" and "duo Q" may be used for system analysis, as described in greater detail below.

Figure 8:
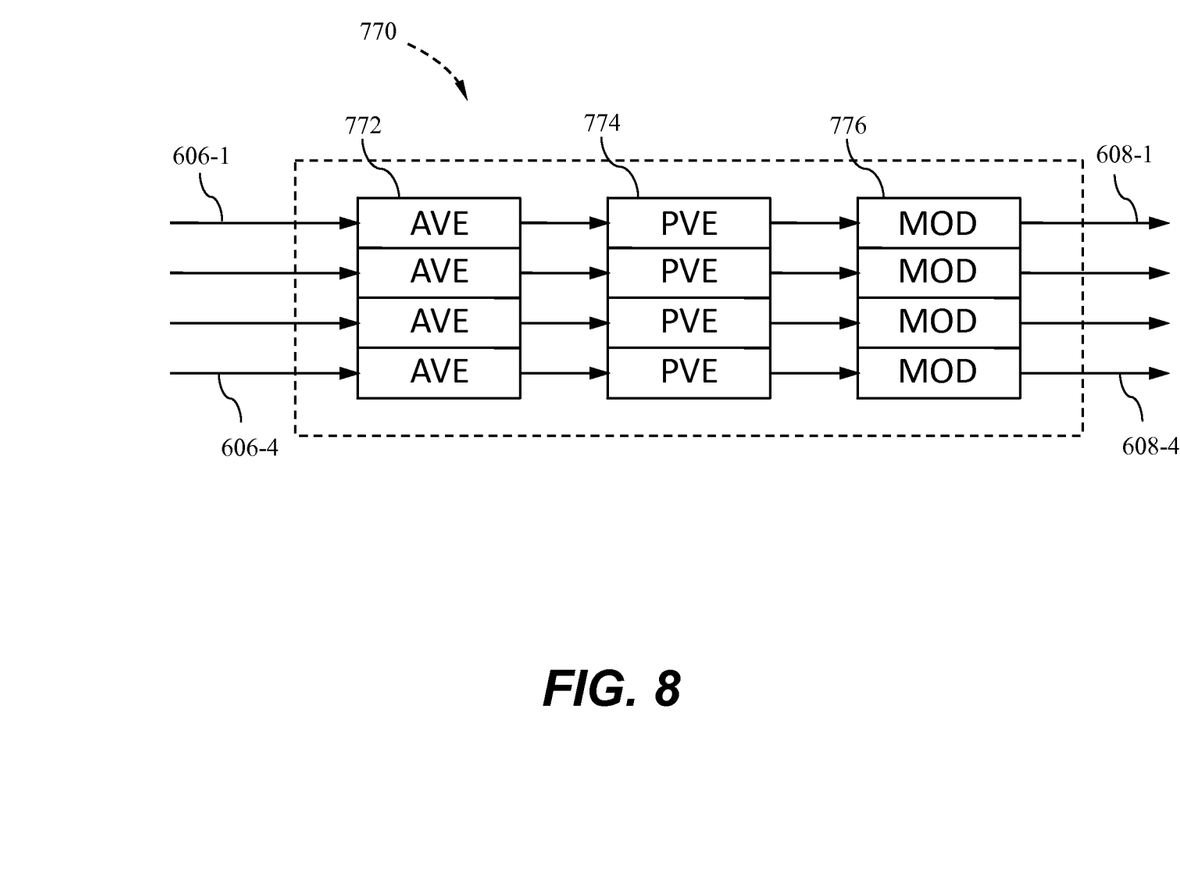
FIG. 8 is a block diagram of certain detail of the optical circuit of FIG. 6.

Turning to FIG. 8, an exemplary optical circuit 770, corresponding to one configuration of the signal conditioner 770, includes amplitude varying elements (AVE) 772, phase varying elements (PVE) 774 and optical modulators (MOD) 776. Lights received along waveguides 706-1 through 706-4 may each be provided to an AVE 772. Each AVE 772 is configured to vary the amplitude of the corresponding light propagating through the AVE 772. Thus, AVE 772 may be a semiconductor optical amplifier (SOA), a variable optical attenuator (VOA), a photodiode, or any other optical element which can amplify propagating light. Here, the term amplify is used broadly to include attenuation, for example when the gain is a fraction between 0 and 1. The photodiode may be an avalanche photodiode or a P-I-N photodiode, reverse biasing such devices resulting in attenuation of the propagating light.

The amplified light is then provided from the AVE 722 to the PVE 724. Each PVE may include phase shifting elements including, for example, an SOA or an VOA. Each PVE 774 may provide a phase shift to the corresponding propagating light to develop a desired phase shift relationship between the propagating lights, four shown in this example. The outputs provided by each PVE 774 is provided to a corresponding one of the modulators 776. Each MOD 776 modulates propagating light, according to a desired data format suitable for transmission over a network infrastructure for example, prior to providing modulated light on each of the output waveguides 608-1 through 608-4.

While shown and discussed with respect to the specific orientation of elements depicted in FIG. 8, one of ordinary skill in the art will appreciate that the AVEs 772, PVEs 774, and MODs 776, if desired, may be alternatively positioned along each light path. For example, the PVE 774 may be positioned to receive light from waveguide 606-1 and provide an output light having a desired phase shift to the AVE 772 for amplification prior to modulation by MOD 776 and provided as an output on waveguide 608-1. Additionally, each AVE 772, PVE 774, and MOD 776 may be positioned at a different location along each signal path with respect to the remaining signals paths. For example, while the signal received from waveguide 606-1 is shown as being provided to AVE 772 prior to passed on to PVE 774, the light received on waveguide 606-2 may be directed to PVE 774 prior to being passed to AVE 772. Also, as one of ordinary skill in the art will appreciate, signal conditioner 770 may include additional elements, such as additional AVEs or PVEs, or other optical elements which passively or actively modify the propagating light.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An optical circuit, comprising:
a multimode interference element having a length; and
first and second waveguides, the first waveguide provided adjacent to and spaced from a first side of the multimode interference element and extending along at least the length of the multimode interference element, the second waveguide provided adjacent to and spaced from a second side of the multimode interference element and extending along at least the length of the multimode interference element,
wherein each of the first and second ends of the first and second waveguides are configured to dissipate light which may be propagating through the first and second waveguides, respectively.

2. The optical circuit of claim 1, wherein the multimode interference element is an optical coupler, an optical splitter, or an optical combiner.

3. The optical circuit of claim 1, wherein the multimode interference element is a multimode interference coupler.

4. The optical circuit of claim 1, wherein the first waveguide is spaced a first distance from the multimode interference element, the first distance being substantially constant along the length of the multimode interference element.

5. The optical circuit of claim 4, wherein the first waveguide includes first and second sides, the first side being adjacent the multimode interference element, the second side of the first waveguide being nonparallel to the first side of the first waveguide.

6. The optical circuit of claim 4, wherein the second waveguide is spaced a second distance from the multimode interference element, the second distance being substantially constant along the length of the multimode interference element.

7. The optical circuit of claim 6, wherein the multimode interference element has a width, the first and second distances being selected such that the first and second waveguides provide sufficient loading during the fabrication process to maintain the width of the multimode interference element within a deviation value.

8. The optical circuit of claim 7, wherein the deviation value associated with the width of the multimode interference element is a first deviation value, a second deviation value being associated with the length of the multimode interference element, such that the first deviation value is about 3% of the second deviation value.

9. The optical circuit of claim 1, wherein the first waveguide includes a tapered portion, such that a width of the first waveguide decreases from a point along the first waveguide to the first end of the first waveguide.

10. The optical circuit of claim 1, wherein the first waveguide includes a first end portion which terminates in the first end of the first waveguide, the first end portion including a curved portion.

11. The optical circuit of claim 10, wherein the curved portion is configured such that the first end is spaced from the multimode interference element a distance which is greater than the first distance.

12. The optical circuit of claim 1, wherein the light is dissipated into the substrate.

13. An optical circuit, comprising:
first, second, and third optical couplers, each having first and second inputs and first and second outputs and a length, the first input of the third optical coupler configured to receive light from the first output of the first optical coupler, the second input of the third optical coupler configured to receive light from the first output of the second optical coupler;
a first waveguide coupled to the second output of the first optical coupler, the first waveguide provided spaced from a first side of the third optical coupler a first distance, the first waveguide extending along at least the length of the third optical coupler;
a second waveguide coupled to the second output of the second optical coupler, the second waveguide provided spaced from a second side of the third optical coupler a second distance, the second waveguide extending along at least the length of the third optical coupler;
a first dummy waveguide provided spaced from a first side of the first optical coupler a third distance, the first dummy waveguide extending along at least the length of the first optical coupler;
a second dummy waveguide provided spaced from a first side of the second optical coupler a fourth distance, the second dummy waveguide extending along at least the length of the second optical coupler, wherein the first, second, third, and fourth distances are substantially the same.

14. The optical circuit of claim 13, wherein each of the first and second dummy waveguides have first and second end portions, each of the first end portions of each of the first and second waveguides being configured to dissipate a portion of light propagating in the first and second waveguides, respectively.

15. The optical circuit of claim 13, wherein each of the first, second, and third optical couplers is a multimode interference coupler.

16. The optical circuit of claim 13, wherein the first dummy waveguide includes first and second sides, the first side adjacent the first optical coupler being nonparallel with respect to the second side.

17. The optical circuit of claim 13, wherein the third optical coupler includes a width, the first and second distances being selected such that the first and second waveguides provide sufficient loading during the fabrication process to maintain the width of the third optical coupler within a deviation value.

18. The optical circuit of claim 17, wherein the deviation value associated with the width of the third optical coupler is a first deviation value, a second deviation value being associated with the length of the third optical coupler, such that the first deviation value is about 3% of the second deviation value.

19. The optical circuit of claim 13, wherein the first waveguide includes a first end, the first end of the first waveguide configured to have a tapered portion, such that a width of the first and second waveguide decreases from a point along the first waveguide to the first end of the first waveguide.

20. The optical circuit of claim 13, wherein the first waveguide includes a first end portion which terminates in the first end of the first waveguide, the first end portion including a curved portion.

21. The optical circuit of claim 19, wherein the curved portion is configured such that the first end of the first waveguide is spaced from the first optical coupler a distance which is greater than the first distance.

22. The optical circuit of claim 13, wherein the first and second optical couplers are spaced a fifth distance, the first optical including a width, the third and fifth distances being selected such that the first dummy waveguide and the second optical coupler provide sufficient loading during the fabrication process to maintain the width of the first optical coupler within a deviation value.

23. The optical circuit of claim 21, wherein the third and fifth distances are substantially the same.

24. The optical circuit of claim 21, wherein the deviation value associated with the width of the first optical coupler is a first deviation value, a second deviation value being associated with the length of the first optical coupler, such that the first deviation value is about 3% of the second deviation value.

25. The optical circuit of claim 13, wherein the first and second optical couplers are spaced a fifth distance, the second optical coupler including a width, the fourth and fifth distances being selected such that the second dummy waveguide and the first optical coupler provide sufficient loading during the fabrication process to maintain the width of the second optical coupler within a deviation value.

26. The optical circuit of claim 24, wherein the fourth and fifth distances are substantially the same.

27. The optical circuit of claim 24, wherein the deviation value associated with the width of second optical coupler is a first deviation value, a second deviation value being associated with the length of the second optical coupler, such that the first deviation value is about 3% of the second deviation value.

28. The optical circuit of claim 13, wherein the first dummy waveguide includes a first end, the first end of the first dummy waveguide configured to have a tapered portion, such that a width of the first dummy waveguide decreases from a point along the first dummy waveguide to the first end of the first waveguide.

29. The optical circuit of claim 13, wherein the first dummy waveguide includes a first end and a first end portion which terminates in the first end of the first dummy waveguide, the first end portion including a curved portion.

30. The optical circuit of claim 28, wherein the curved portion is configured such that the first end of the first dummy waveguide is spaced from the first optical coupler a distance which is greater than the third distance.

31. The optical circuit of claim 28, wherein the curved portion is configured to dissipate a portion of light propagating in the first dummy waveguide.

32. The optical circuit of claim 30, wherein the light is dissipated into the substrate.

* * * * *